United States Patent Office 3,364,237
Patented Jan. 16, 1968

3,364,237
4,8,14 - TRIMETHYL - 9α - HYDROXY - 18 - NOR-
8α,14β - ANDROST - 4 - EN - 3,11,17 - TRIONE
AND DERIVATIVES THEREOF
Patrick A. Diassi, Westfield, and Pacifico A. Principe,
South River, N.J., assignors to E. R. Squibb & Sons,
Inc., New York, N.Y., a corporation of Delaware
No Drawing. Continuation-in-part of application Ser. No.
442,492, Mar. 24, 1965. This application Dec. 8, 1965,
Ser. No. 512,556
The portion of the term of the patent subsequent to
Sept. 26, 1984, has been disclaimed
4 Claims. (Cl. 260—397.3)

ABSTRACT OF THE DISCLOSURE

This application relates to compounds having the formula

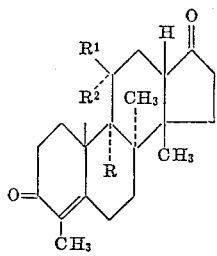

wherein R is selected from the group consisting of hydrogen and hydroxy, $R^1$ is hydroxy, $R^2$ is hydrogen and $R^1$ and $R^2$ together are oxo (O=).

The compounds of the above-identified formula possess anti-androgenic activity.

---

This application is a continuation-in-part of U.S. application, Ser. No. 442,492, filed Mar. 24, 1965.

This invention relates to and has for its object the provision of new physiologically active compounds, and more particularly, compounds of the formula

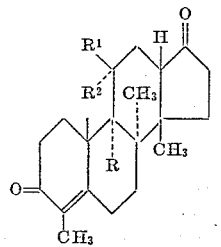

wherein R is selected from the group consisting of hydrogen and hydroxy, $R^1$ is hydroxy, $R^2$ is hydrogen and $R^1$ and $R^2$ together are oxo (O=).

The novel compounds of this invention are pharmacologically active substances which possess anti-androgenic activity (i.e., they inhibit the actions of androgens), and which may be used in the treatment of such conditions as hyperandrogenic acne. They also possess anti-estrogenic and anti-gonadotrophic activity.

The compounds may be formulated for such administration, the concentration and/or dosage being based on the activity of the particular compound and the requirements of the patient.

The final products of this invention are prepared by the process of this invention which entails beginning with 4,8,14-trimethyl-18-nor-5α,8α,14β - androstane - 3,11,17-trione as the starting reactant. The preparation of this compound is disclosed in copending U.S. patent application, Ser. No. 399,339, filed Sept. 25, 1964, now abandoned.

It has been found that the compounds of this invention, namely, 4,8,14-trimethyl-9α-hydroxy-18-nor-8α,14β-androst-4-en-3,11,17-trione can be prepared from the starting material by subjecting the latter to the action of a microorganism of the genus Nocardia or to the action of the enzymes thereof under oxidizing and preferably aerobic conditions. Further, it has been found that when the starting material is subjected to the action of a microorganism of the genus Pseudomonas or to the action of the enzymes thereof under oxidizing and preferably aerobic conditions, 4,8,14-trimethyl-18-nor-8α,14β-androst-4-en-3,11,17-trione is formed. The 4,8,14-trimethyl - 11β - hydroxy - 18 - nor - 8α,14β - androst - 4-en-3,17-dione compound of this invention can be prepared by subjecting 4α,8,14-trimethyl-11β-hydroxyl - 18 - nor-5α,8α,14β-androstane-3,17-dione to the action of a microorganism of the genus Pseudomonas. The preparation of this starting material is disclosed in U.S. patent application, Ser. No. 455,002, filed May 11, 1965.

To prepare the compounds of this invention, the starting reactant may be first subjected to the action of enzymes of a microorganism of the genus Nocardia or Pseudomonas under oxidizing conditions. This oxidation can best be effected either by including the starting reactant in an aerobic culture of the microorganism, or by bringing together in an aqueous medium, the compounds, air, and enzymes of a non-proliferating cells of the microorganism.

In general, the conditions of culturing the microorganism for the purposes of this invention are (except for the inclusion of the starting reactant to be converted), the same as those of culturing various other microorganisms for the production of antibiotics, vitamin B–12, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four to ninety-six hours being feasible, but not limiting.

The invention may be illustrated by the following examples, all temperatures are in degrees centigrade unless otherwise stated:

EXAMPLE 1

4α,8,14-trimethyl-9α-hydroxy-18-nor-8α,14β-androst-4-en-3,11,17-trione (XV)

Surface growth from each of two, two-week-old agar slants of Nocardia restrictus ATCC (American Type Culture Collection) No. 14887 (obtainable from American Type Culture Center, 12301 Parklawn Drive, Rockville, Md.), the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After eighteen hours incubation at 25° C. with continuous rotary agitation (280 cycles/minute; two-inch radius) 5% (v.:v.) transfers are made to forty 250 ml. Erlenmeyer flasks, each containing 50 ml. of freshly sterilized medium B plus 300 micrograms/ml. of 4α,8,14-trimethyl-18-nor-5α,8α,14β-androstane-3,11,17 - trione. The steroid is added by supplementing each flask with 0.5 ml. of a sterile solution (30 mg./ml.) of the steroid in N,N-dimethylformamide. A total of 600 mg. is fermented. After eight days further incubation, using the same conditions as described above, the contents of the flasks are pooled and the broth is then adjusted to pH 4.0 using 12 N $H_2SO_4$. The acidified broth is then filtered through a Seitz clarifying pad. The flasks, mycelium and pad are washed with successive 50 ml. portions of warm water. The combined filtrate and washings have a volume of 2500 ml. The combined filtrate is then extracted three times with 800 ml. portions of chloroform which are combined, washed twice with 1 liter of water and evaporated to dryness, in vacuo. The residue (890 mg.) is plate chromatographed on Woelm neutral alumina (Activity V) using chloroform as the developing solvent. A band detectable by UV at $R_f$ 0.6 is eluted with ethyl acetate and evaporated. The residue on crystallization from acetone-hexane gives 102 mg. of XV having a melting point about 202–204° C., $[\alpha]_D^{22}$ —45° (chloroform), $$\lambda_{max}^{alc} \ 248 \ m\mu \ (\epsilon, 16,300)$$

*Analysis.*— Calc'd for $C_{21}H_{28}O_4$ (344.44): C, 73.22; H, 8.19. Found: C, 73.96; H, 8.24.

EXAMPLE 2

4α,8,14-trimethyl-18-nor-8α,14β-androst-4-en-3,11,17-trione

Surface growth from each of four, two-week-old agar slants of *Pseudomonas testosteroni* ATCC (American Type Culture Collection) No. 11996, the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of 0.01% aqueous sodium lauryl sulfate solution. One ml. portions of this suspension are used to inoculate sixteen 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After eighteen hours incubation at 25° C. with continuous rotary agitation (280 cycles/minute; two-inch radius), 5% (v.:v.) transfers are made to one hundred 250 ml. Erlenmeyer flasks, each containing 50 ml. of freshly sterilized medium B. After twenty-four hours of further incubation, using the same conditions described above, each flask is supplemented with 200 micrograms/ml. of 4α,8,14-trimethyl-18-nor-5α,8α,14β - androstane - 3,11,17-trione. The steroid is added by supplementing each flask with 0.25 ml. of a sterile solution (40 mg./ml.) of the steroid in N,N-dimethylformamide. A total of 1.0 gm. is fermented. After six days of further incubation, using the same conditions as described above, the contents of the flasks are pooled and the broth is then adjusted to pH 4.0 using 12 N $H_2SO_4$. The acidified broth is then filtered through a Seitz clarifying pad. The flasks, mycelium and pad are washed with successive 50 ml. portions of warm water. The combined filtrate and washings have a volume of 5700 ml. They are extracted three times with 1900 ml. portions of chloroform which are combined, washed twice with 2 liter portions of water and evaporated in vacuo. The residue is plate chromatographed on Woelm neutral alumina (Activity V) using chloroform as the developing solvent. The band at $R_f \approx 0.5$ is eluted with ethyl acetate, evaporated and crystallized from acetone-hexane to give 256 mg. of 4α,8,14-trimethyl-18-nor-8α,14β - androst-4-en-3,11,17-trione having a melting point about 173–175° C., $[\alpha]_D^{22}$ —62° (chloroform), $$\lambda_{max}^{alc} \ 252 \ m\mu \ (\epsilon, 13,100)$$

*Analysis.*—Calc'd for $C_{21}H_{28}O_3$ (328.46): C, 76.79; H, 8.59. Found: C, 76.74; H, 8.54.

EXAMPLE 3

4,8,14-trimethyl-11β-hydroxy-18-nor-8α-14β-androst-4-ene-3,17-dione (A) *Fermentation.*—Surface growth from a two-week old agar slant of *Pseudomonas testosteroni* (ATCC 11996), the slant containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of 0.01% aqueous sodium lauryl sulfate solution. One ml. portions of this suspension are used to inoculate three 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After twenty-four hours incubation at 25° with continuous rotary agitation (280 cycles/minute; two-inch stroke), 5% (vol./vol.) transfers are made to ten 250 ml. Erlenmeyer flasks, each containing 50 ml. of freshly sterilized medium B. After twenty-four hours of further incubation, using the same conditions as described above, the steroid (200 micrograms/ml.) is added by supplementing each flask with 0.25 ml. of a sterile solution (40 mg./ml.) of 4α,8,14-trimethyl-11β-hydroxy - 18 - nor - 5α,8α,14β - androstane-3,17-dione in N,N-dimethylformamide. A total of 100 mg. is fermented. After four days of further incubation, using identical conditions as described above, the fermentation broth is harvested. The contents of the flasks are pooled and extracted three times with 200 ml. of chloroform. The chloroform extracts are pooled, washed with water and evaporated under reduced pressure. Plate chromatography of the residue on alumina (Activity V) using chloroform as the developing solvents gives two bands at $Rf \approx 0.7$ and $Rf \approx 0.8$, respectively. These bands are separated, eluted with chloroform and evaporated. Crystallization of the less polar material gives 28 mg. of 4α,8,14-trimethyl-18-nor-8α,14β-androst-4-ene-3,11,17 - dione having a melting point about 173–175°. The more polar material on crystallization from acetone-hexane gives 21 mg. of 4,8,14-trimethyl-11β-hydroxy-18-nor-8α,14β-androst-4-ene-3,17-dione having a melting point about $[\alpha]_D^{22} +218°$ (chloroform), $$\lambda_{max.}^{alc.} \ 258 \ m\mu \ (\epsilon, \ 15,300)$$

*Analysis.*—Calc'd for $C_{21}H_{30}O_3$ (330.45): C, 76.32; H, 9.15. Found: C, 76.28; H, 9.18.

While there have been described various embodiments of the invention, the compositions and methods described are not intended to be understood as limiting the scope of the invention, as it is realized that changes therein are possible of the following claims is to be understood as referring to all equivalent elements for accomplishing substantially the same results in substantially the same or equivalent manner, it covering the invention broadly in whatever form its principle may be utilized.

What is claimed is:
1. A compound having the formula

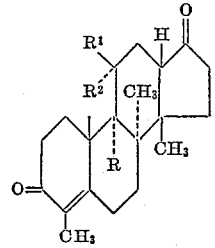

wherein R is selected from the group consisting of hydrogen and hydroxy, $R^1$ is hydroxy, $R^2$ is hydrogen and $R^1$ and $R^2$ together are oxo (O=).

2. A compound in accordance with claim 1 wherein R and $R^2$ are hydrogen and $R^1$ is hydroxy, which has the name 4,8,14 - trimethyl - 11β - hydroxy - 18 - nor - 8α, 14β-androst-4-ene-3,17-dione.

3. The compound in accordance with claim 1 wherein R is hydroxy and $R^1$ and $R^2$ together are oxo (O=), having the name 4,8,14 - trimethyl-9α - hydroxy - 18-nor-8α, 14β-androst-4-en-3,11,17-trione.

4. A compound in accordance with claim 1 wherein R is hydrogen and $R^1$ and $R^2$ together are oxo (O=), having the name 4,8,14 - trimethyl - 18 - nor - 8α,14β-androst-4-en-3,11,17-trione.

References Cited
UNITED STATES PATENTS 3,320,290  5/1967  Diassi et al. _____ 260—397.3

ELBERT ROBERTS, *Primary Examiner.*